US012636708B2

(12) United States Patent

Hecht

(54) CUTTING TOOL HAVING CUTTING INSERT AND INSERT HOLDER WITH INTERFACE HAVING A PAIR OF MALE AND FEMALE TYPE ENGAGEMENT MEMBERS

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 383 days.

(21) Appl. No.: 18/419,628

(22) Filed: Jan. 23, 2024

(65) Prior Publication Data

US 2025/0235933 A1     Jul. 24, 2025

(51) Int. Cl.
B23B 27/16          (2006.01)

(52) U.S. Cl.
CPC ................................ B23B 27/1611 (2013.01)

(58) Field of Classification Search
CPC .............. B23B 27/1611; B23B 27/065; B23B 27/1622; B23B 2200/049; B23B 2200/161; B23B 2200/165; B23B 2205/12; B23B 2205/15
See application file for complete search history.

(56) References Cited

U.S. PATENT DOCUMENTS

| | | | |
|---|---|---|---|
| 4,722,642 | A | 2/1988 | Musacchia, Jr. |
| 5,542,795 | A | 8/1996 | Mitchell |
| 5,682,803 | A | 11/1997 | Boianjiu |
| 5,738,468 | A | 4/1998 | Boianjiu |
| 6,481,936 | B1 | 11/2002 | Hecht |

(10) Patent No.:     US 12,636,708 B2
(45) Date of Patent:        May 26, 2026

| | | | |
|---|---|---|---|
| 6,536,996 | B2 | 3/2003 | Satran et al. |
| 6,623,216 | B2 | 9/2003 | Hansson |
| 6,840,716 | B2 | 1/2005 | Morgulis et al. |
| 6,921,233 | B2 | 7/2005 | Duerr et al. |
| 7,201,545 | B2 | 4/2007 | Ejderklint |
| 7,632,046 | B2 | 12/2009 | Andersson et al. |
| 7,819,610 | B2 | 10/2010 | Wallström et al. |
| 7,832,964 | B2 | 11/2010 | Andersson et al. |

(Continued)

FOREIGN PATENT DOCUMENTS

| | | |
|---|---|---|
| JP | H 6-126511 | 5/1994 |
| WO | WO 2009/083952 A1 | 7/2009 |

OTHER PUBLICATIONS

International Search Report and Written Opinion dated Jun. 17, 2025, issued in PCT counterpart application No. PCT/IL2025/050001.

*Primary Examiner* — Moshe Wilensky

(74) *Attorney, Agent, or Firm* — Womble Bond Dickinson (US) LLP

(57)          ABSTRACT

A cutting tool having a cutting insert releasably retained in insert pocket by a fastening member. The insert pocket has first and second side surfaces. The insert pocket has a base surface which includes at least one male or female type pocket engagement member which includes at least one sloping pocket wedge abutment surface. The insert has first and second side abutment surfaces. The cutting insert has an insert lower surface which includes at least one male or female type insert engagement member which includes at least one sloping insert wedge abutment surface. By virtue of the sloping orientation of the at least one pocket wedge abutment surface and the at least one insert wedge abutment surface, a clamping force applied by the fastening member urges said surfaces to slide over each other so that the cutting insert sits firmly in the insert pocket.

22 Claims, 7 Drawing Sheets

(56)  References Cited

U.S. PATENT DOCUMENTS

| | | | |
|---|---|---|---|
| 9,138,813 | B2 | 9/2015 | Hansson |
| 9,481,039 | B2 | 11/2016 | Park |
| 9,573,204 | B2 | 2/2017 | Hecht |
| 2006/0216121 | A1 | 9/2006 | Edler et al. |
| 2020/0254540 | A1 | 8/2020 | Elkayam |
| 2022/0371101 | A1 | 11/2022 | Choi et al. |

CUTTING TOOL HAVING CUTTING INSERT AND INSERT HOLDER WITH INTERFACE HAVING A PAIR OF MALE AND FEMALE TYPE ENGAGEMENT MEMBERS

FIELD OF THE INVENTION

The subject matter of the present application relates to cutting tools, and in particular, to cutting tools, and further in particular, to cutting tools of the type in which a cutting insert is removably attached to an insert holder by a fastening member, and yet further in particular, to cutting tools where an interface between the cutting insert and the insert holder has at least one pair of male and female type engagement members.

BACKGROUND OF THE INVENTION

A cutting tool for metalworking operations may comprise a cutting insert removably attached to an insert holder. More precisely, the insert holder has an insert pocket and the cutting insert is releasably retained in the insert pocket by a fastening member.

In some such cutting tools, the contact between a lower surface of the cutting insert and a base surface of the insert pocket is non-planar. For example, the pocket and insert can include at least one protrusion and at least one recess which inter engage with each other. One example of such a cutting tool is disclosed in, for example, U.S. Pat. No. 7,832,964, which discloses engagement between a ridge and a groove via pairs of flanks on both the ridge and the groove. Another example is U.S. Pat. No. 9,138,813, which discloses a hole-making tool having a pair of female-like and male-like securing means arranged in the interface between the tangential support surface of the seat and the underside of the cutting insert.

It is an object of the subject matter of the present application to provide a new and improved cutting tool.

SUMMARY OF THE INVENTION

The cutting tool disclosed herein may have improved stability while performing front and back turning metal cutting operations. In some embodiments, the cutting tool disclosed herein may have improved stability while performing push and pull thread turning metal cutting operations. In certain embodiments, the cutting tool disclosed herein may have improved stability during extreme working conditions. In particular embodiments, the cutting tool disclosed herein may have a precise corner height of the cutting edge.

In accordance with an aspect of the subject matter of the present application there is provided a cutting tool, having a flank infeed axis defining opposite front and back feed directions, the cutting tool comprising:

an insert holder comprising:

a holder pocket recess surface and a holder pocket opening surface intersecting the holder pocket recess surface; and an insert pocket having a pocket central axis, the insert pocket being recessed in the holder pocket recess surface and opening out to the holder pocket opening surface at a pocket opening, and comprising:

a pocket peripheral surface extending partially circumferentially about the pocket central axis and forming a partial boundary of a pocket base surface, wherein:

the pocket peripheral surface comprises first and second pocket side abutment surfaces which converge towards each other in the back feed direction and define first and second pocket side half-planes, respectively, which both extend from a half-plane axis; and the pocket base surface comprises three pocket base abutment surfaces, the three pocket base abutment surfaces being angularly spaced apart about the pocket central axis and comprising:

at least one pocket support abutment surface; and at least one pocket wedge abutment surface formed on at least one male or female type pocket engagement member, the at least one pocket wedge abutment surface sloping with respect to the pocket central axis;

wherein in a top the insert pocket, for any given contact point on the at least one pocket wedge abutment surface:

an imaginary straight first line containing the given contact point intersects the first pocket side half-plane perpendicularly at a first intersection point;

an imaginary straight second line containing the given contact point intersects the second pocket side half-plane perpendicularly at a second intersection point;

the first and second intersection points subtend a main angle at the given contact point;

an imaginary straight contact line oriented perpendicularly to the at least one pocket wedge abutment surface and containing the contact point intersects at least one of the first and second pocket side half-planes at a contact intersection point;

the contact and second intersection points subtend a contact angle at the given contact point, the contact angle satisfying the condition: $0°<\beta<\alpha$; and a cutting insert having an insert central axis, the cutting insert (22) comprising:

opposite insert upper and lower surfaces and an insert peripheral surface extending therebetween;

a cutting edge formed at the intersection of the insert upper surface and the insert peripheral surface; wherein:

the insert peripheral surface comprises at least three insert side surfaces and at least three insert corner surfaces alternating therewith, the at least three insert side surfaces comprising first and second insert side abutment surfaces, respectively;

the insert lower surface comprises three insert lower abutment surfaces angularly spaced apart about the insert central axis, the three insert lower abutment surfaces comprising:

at least one insert bearing abutment surface; and at least one insert wedge abutment surface formed on at least one male or female type insert engagement member, the male or female type insert engagement member being the opposite type to the at least one male or female type pocket engagement member, the at least one insert wedge abutment surface sloping with respect to the insert central axis; wherein:

the cutting insert is removably retained in the insert pocket by a fastening member;

the first and second pocket side abutment surfaces abut the first and second insert side abutment surfaces, respectively;

the at least one pocket support abutment surface abuts the at least one insert bearing abutment surface; and the at least insert engagement member engages with the at least pocket engagement member, the at least one pocket wedge abutment surface abutting the at least one insert wedge abutment surface.

It is understood that the above-said is a summary, and that features described hereinafter may be applicable in any combination to the subject matter of the present application, for example, any of the following features may be applicable to the turning tool. Further, to the extent consistent, any of the embodiments or aspects described herein may be used in conjunction with any or all of the other embodiments or aspects described herein.

One of the at least one pocket support abutment surface can be located adjacent the pocket opening. One of the at least one insert bearing abutment surface can be located under the cutting edge.

The at least one pocket support abutment surface can be planar. The at least one insert bearing abutment surface can be planar.

The first pocket side abutment surface and the pocket opening can be located on one side of a feed plane containing the flank infeed axis and the pocket central axis and the second pocket side abutment surface can be located on the other side of the feed plane.

The insert lower surface can abut the pocket base surface only at the three insert lower abutment surfaces and the three pocket base abutment surfaces, respectively.

The at least one pocket engagement member can comprise at least one pocket wedge protrusion projecting from the pocket base surface, the at least one pocket wedge protrusion having at least one pocket wedge abutment surface formed thereon. The at least one insert engagement member can comprise at least one insert wedge recess recessed in the insert lower surface, the at least one insert wedge recess having at least one insert wedge abutment surface formed thereon. The at least one pocket wedge protrusion can be located in the at least insert wedge recess.

Each of the at least one pocket wedge protrusion can have exactly one pocket wedge abutment surface formed thereon.

Each of the at least one insert wedge recess can have exactly one insert wedge abutment surface formed thereon.

The at least one insert wedge abutment surface can be planar.

In a cross-sectional view taken in a pocket vertical plane oriented parallel to the pocket central axis and intersecting the at least one pocket wedge abutment surface, the at least one pocket wedge abutment surface can be convexly curved.

The insert pocket comprises at least one pocket support protrusion projecting from the pocket base surface, the at least one pocket support protrusion can have at least one pocket support abutment surface formed thereon.

Each of the at least one pocket support protrusion can have exactly two insert wedge bearing surfaces formed thereon.

The insert lower surface can comprise a planar insert lower base surface. Each of the at least one insert bearing abutment surface can be formed on the insert lower base surface.

The pocket base surface can comprise exactly three pocket base abutment surfaces. The insert lower surface can comprise exactly three insert lower abutment surfaces.

The pocket base surface can have a triangular basic shape defined by exactly three pocket base corner portions. The exactly three pocket base abutment surfaces can be located at different pocket corner base portions.

The exactly three pocket base abutment surfaces can comprise exactly one pocket wedge abutment surface and exactly two pocket support abutment surfaces. The exactly three insert lower abutment surfaces can comprise exactly one insert wedge abutment surface and exactly two insert bearing abutment surfaces.

The first and second pocket side surfaces can be connected by a pocket intermediate side surface. The exactly one pocket wedge abutment surface can be located closer to the pocket intermediate side surface than the exactly two pocket support abutment surfaces.

The contact angle can satisfy the condition: $0°<\beta<\alpha/2$.

The cutting insert can comprise exactly three cutting edges formed at the intersection of the insert upper surface and the insert peripheral surface. The exactly three cutting edges can be located at different insert corner portions.

The fastening member can be configured to apply a clamping force on the cutting insert in a clamping force direction. The at least one pocket wedge abutment surface and the at least one insert wedge abutment surface can be configured to slide over each other when the clamping force is applied on the cutting insert so that the first and second insert side abutment surfaces are urged towards and come into contact with the first and second pocket side abutment surfaces, respectively.

The cutting insert can comprise a through hole extending along the insert central axis and opening out to the insert upper and lower surfaces. The insert pocket can comprise a threaded hole extending along the pocket central axis and opening out to the pocket base surface. The fastening member can be a clamping screw. The clamping screw can be located in the through hole and threadingly engaged with the threaded hole.

The threaded hole can be centric in relation to the through hole.

The insert holder can comprise a shim releasably attached there. The pocket base surface can be formed on the shim.

BRIEF DESCRIPTION OF THE FIGURES

For a better understanding of the present application and to show how the same may be carried out in practice, reference will now be made to the accompanying drawings, in which.

Figure 1:
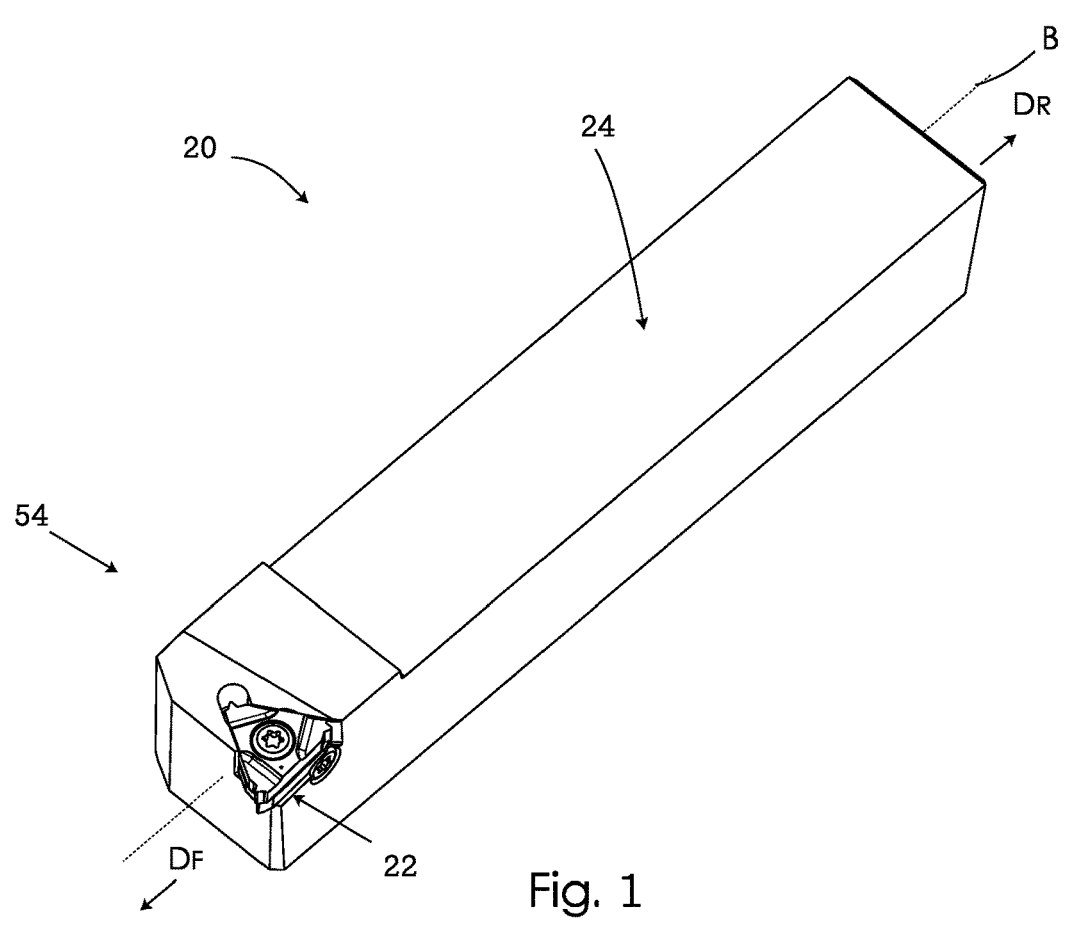
FIG. 1 is a perspective view of a cutting tool in accordance with the present invention.
Figure 2:
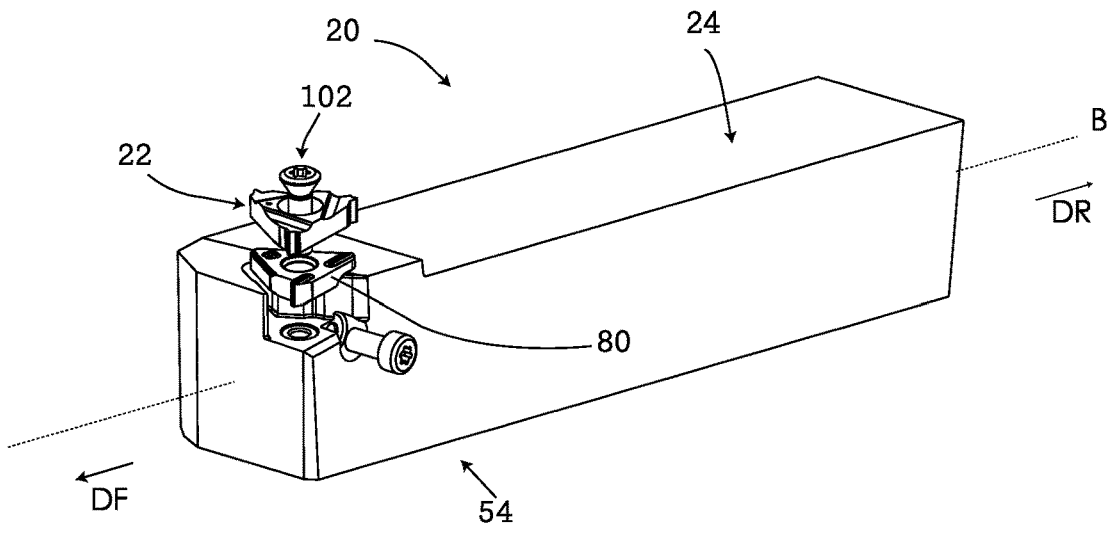
FIG. 2 is a perspective exploded view of the cutting tool shown in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 11:
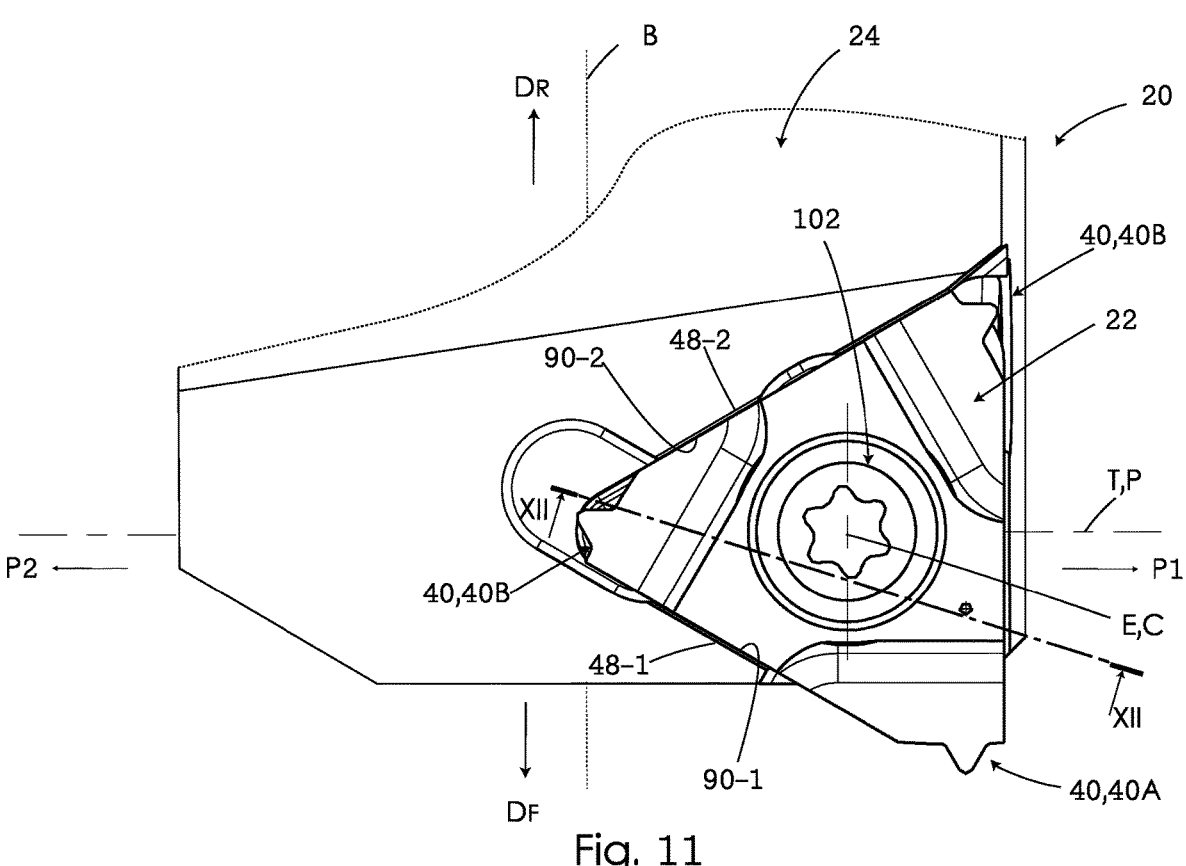
FIG. 11 is a top view of a forward end of the cutting tool shown in FIG. 1.

Attention is first drawn to FIG. 1 showing a cutting tool 20. In this non-limiting example shown in the drawings, the cutting tool 20 is of the type used for threading, more precisely thread turning, in accordance with an embodiment of the subject matter of the present application. However, it is noted that invention also applies to other types of metal cutting such as milling and turning. The cutting tool 20 has a replaceable cutting insert 22 and an insert holder 24. The cutting tool 20 is adjustable between an assembled position and an unassembled position. In the assembled position of the cutting tool 20, the cutting insert 22 is removably retained in an insert pocket 26 of the insert holder 24. As seen in FIG. 11, the cutting tool 20 has a flank infeed axis T which defines opposite front and back feed directions P1, P2. The front feed direction P1 is the direction in which the cutting tool 20 moves relative to a workpiece, rotating about an axis of rotation, when performing a linear flank infeed front turning operation. Likewise, the back direction P2 is the direction in which the cutting tool 20 moves relative to a rotating workpiece when performing a linear flank infeed back turning operation. Generally speaking, the flank infeed axis T is parallel to the axis of rotation.

Making reference to FIGS. 3 to 6, a first aspect of the subject matter of the present application relates to the cutting insert 22. The cutting insert 22 is made of a hard material. For example, the cutting insert 22 may be made of cemented carbide. It is noted that the cutting insert 22 has a simple geometry which may allow it to be pressed. In some embodiments, the cutting insert 22 may be pressed without an additional grinding manufacturing process.

The cutting insert 22 includes opposite insert upper and lower surfaces 28, 30 and an insert peripheral surface 32 which extends therebetween. The cutting insert 22 has an insert central axis C. The insert peripheral surface 32 extends circumferentially about, and faces away from the insert central axis C. The insert lower surface 30 can include a planar insert lower base surface 34.

In accordance with some embodiments of the subject matter of the present application, the cutting insert 22 can include a through hole 36, for receiving a fastening member 102 (e.g., a clamping screw as discussed later in the description). The through hole 36 can extend along the insert central axis C. The through hole 36 can open out to the insert upper and lower surfaces 28, 30.

Figure 3:
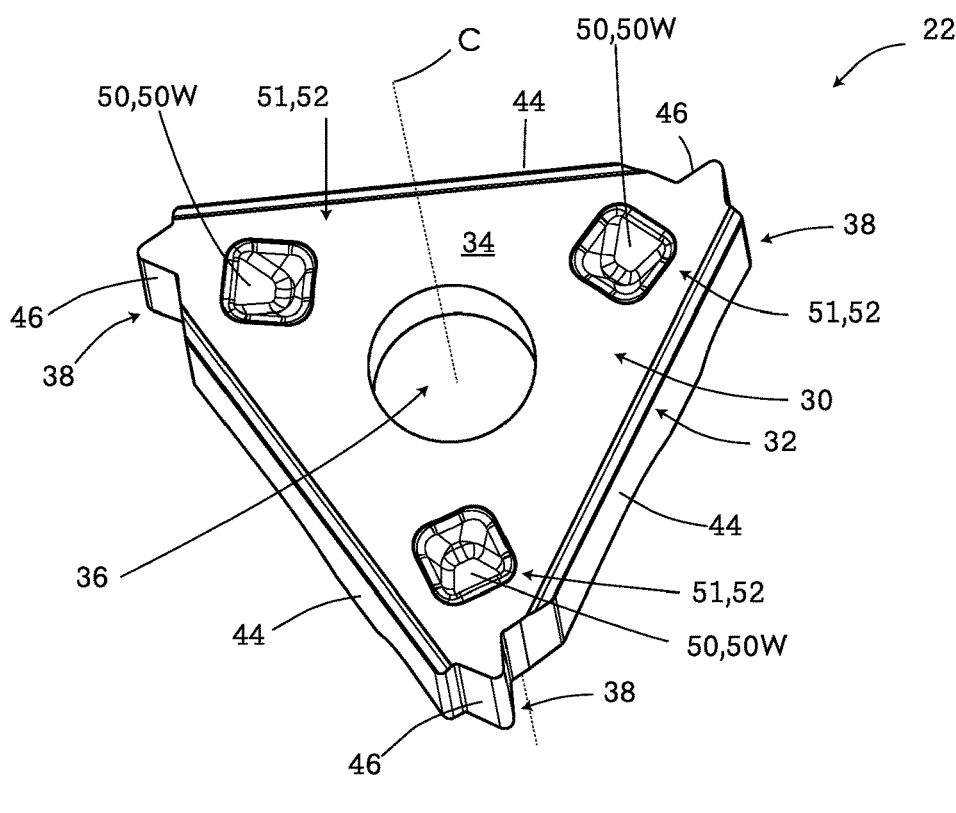
FIG. 3 is a perspective view of the bottom of a cutting insert shown in FIG. 1.

Referring to FIG. 3, the cutting insert 22 has a polygonal basic shape defined by at least three insert corner portions 38. The insert upper and lower surfaces 28, 30 also have a corresponding polygonal basic shape. In accordance with some embodiments of the subject matter of the present application, the cutting insert 22 can exhibit N-fold rotational symmetry about the insert central axis C, where N is a positive integer greater than or equal to three. In this non-limiting example shown in the drawings, N=3, i.e., the cutting insert 22 has triangular shape defined by exactly three insert corner portions 38.

Figure 4:
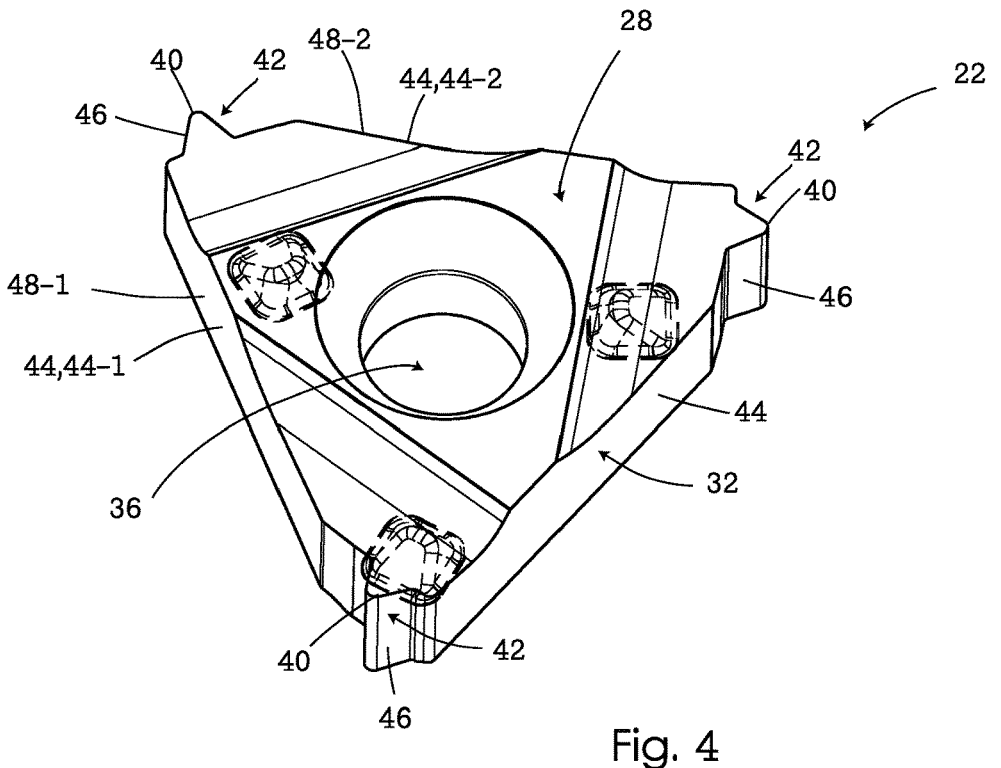
FIG. 4 is a perspective view of the top of the cutting insert shown in FIG. 3.

Making reference to FIG. 4, the cutting insert 22 includes a cutting edge 40, configured to perform metal cutting operations, formed at the intersection of the insert upper surface 28 and the insert peripheral surface 32. Part of the insert upper surface 28 adjoining and extending away from the cutting edge 40 serves as a rake surface. Part of the insert peripheral surface 32 adjoining and extending away from the cutting edge 40 serves as a relief surface. In the triangular shaped configuration of the cutting insert 22, the cutting insert 22 can include exactly three cutting edges 40 formed at the intersection of the insert upper surface 28 and the insert peripheral surface 32. The exactly three cutting edges 40 can be located at different insert corner portions 38. When the cutting tool 20 is assembled (see FIG. 11) one of the cutting edges 40 forms an active cutting edge 40A and the remaining cutting edges 40 for non-active cutting edges 40B. The cutting insert 22 has N indexable positions in which it can be seated in the insert pocket 26, each indexable position having one active cutting edge associated therewith. It is noted that the cutting insert 22 is of the 'laydown' type.

In accordance with some embodiments of the subject matter of the present application, the cutting edge 40 can be formed on a cutting tooth 42 located at a respective insert corner portion 38. In the assembled position of the cutting tool 20, the cutting tooth 42 can project in a direction perpendicular to the front feed direction P1 (see FIG. 11).

The insert peripheral surface 32 includes at least three insert side surfaces 44. The insert peripheral surface 32 includes at least three insert corner surfaces 46 formed at the insert corner portions 38. The at least three insert side surfaces 44 alternate with the at least three insert corner surfaces 46. Each insert side surface 44 extends between two adjacent insert corner surfaces 46. The at least three insert side surfaces 44 include first and second insert side surfaces 44-1, 44-2. In the triangular shaped configuration of the cutting insert 22, the insert peripheral surface 32 includes exactly three insert side surfaces 44 and exactly three insert corner surfaces 46. It is noted that the cutting edge 40, is formed at the intersection of the insert upper surface 28 and one of the at least three insert corner surfaces 46.

The first and second insert side surfaces 44-1, 44-2 include first and second insert side abutment surfaces 48-1, 48-2, respectively. The first and second insert side abutment surfaces 48-1, 48-2 define first and second insert side planes SI1, SI2, respectively (see FIG. 6).

The insert lower surface 30 includes three insert lower abutment surfaces 50. The three insert lower abutment surfaces 50 are angularly spaced apart about the insert central axis C. The three insert lower abutment surfaces 50 are configured for abutting a complementary surface on the insert pocket 26. In accordance with some embodiments of the subject matter of the present application, the insert lower surface 30 can include exactly three insert lower abutment surfaces 50.

Figure 7:
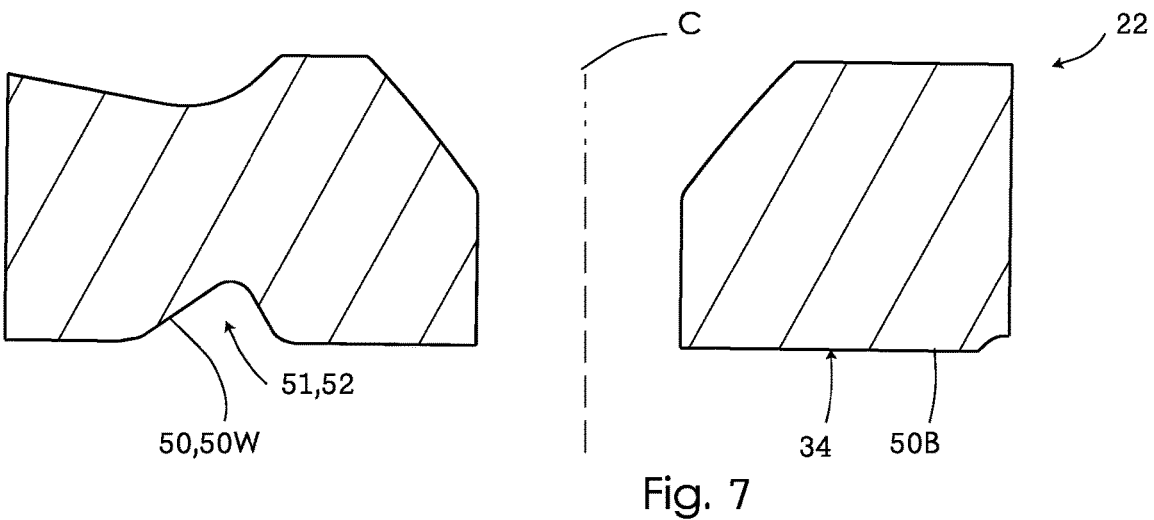
FIG. 7 is a cross section view taken along lines VII-VII shown in FIG. 6.

Reverting to FIG. 7, the three insert lower abutment surfaces 50 include at least one insert wedge abutment surface 50W. The at least one insert wedge abutment surface 50W is formed on at least one male or female type insert engagement member 51. The at least one insert wedge abutment surface 50W is sloped relative to the insert central axis C. In accordance with some embodiments of the subject matter of the present application, the at least one insert wedge abutment surface 50W converges towards at least one of the first and second insert side planes SI1, SI2 in a direction away from the insert upper surface 28. The at least one insert wedge abutment surface 50W can be planar. In the configuration of the insert lower surface 30 having exactly three insert lower abutment surfaces 50, the exactly three insert lower abutment surfaces 50 can include exactly one insert wedge abutment surface 50W.

In accordance with some embodiments of the subject matter of the present application, the at least insert engagement member 51 can include at least one insert wedge recess 52 recessed in the insert lower surface 30. In accordance with some embodiments of the subject matter of the present application, the at least insert engagement member 51 can be located on the planar insert lower base surface 34.

In accordance with some embodiments of the subject matter of the present application, the at least one insert wedge recess 52 can have at least one insert wedge abutment surface 50W formed thereon. Each of the at least one insert wedge recess 52 can have exactly one insert wedge abutment surface 50W formed thereon.

Figure 5:
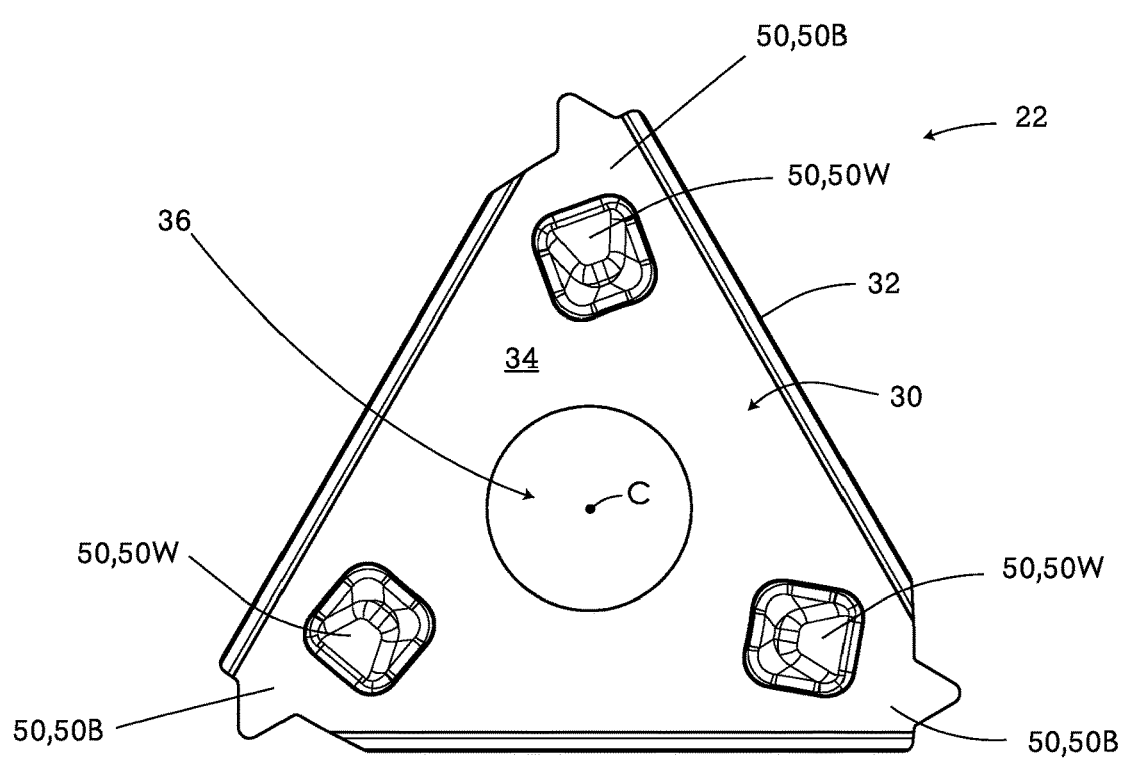
FIG. 5 is a bottom view of the cutting insert shown in FIG. 3.
Figure 6:
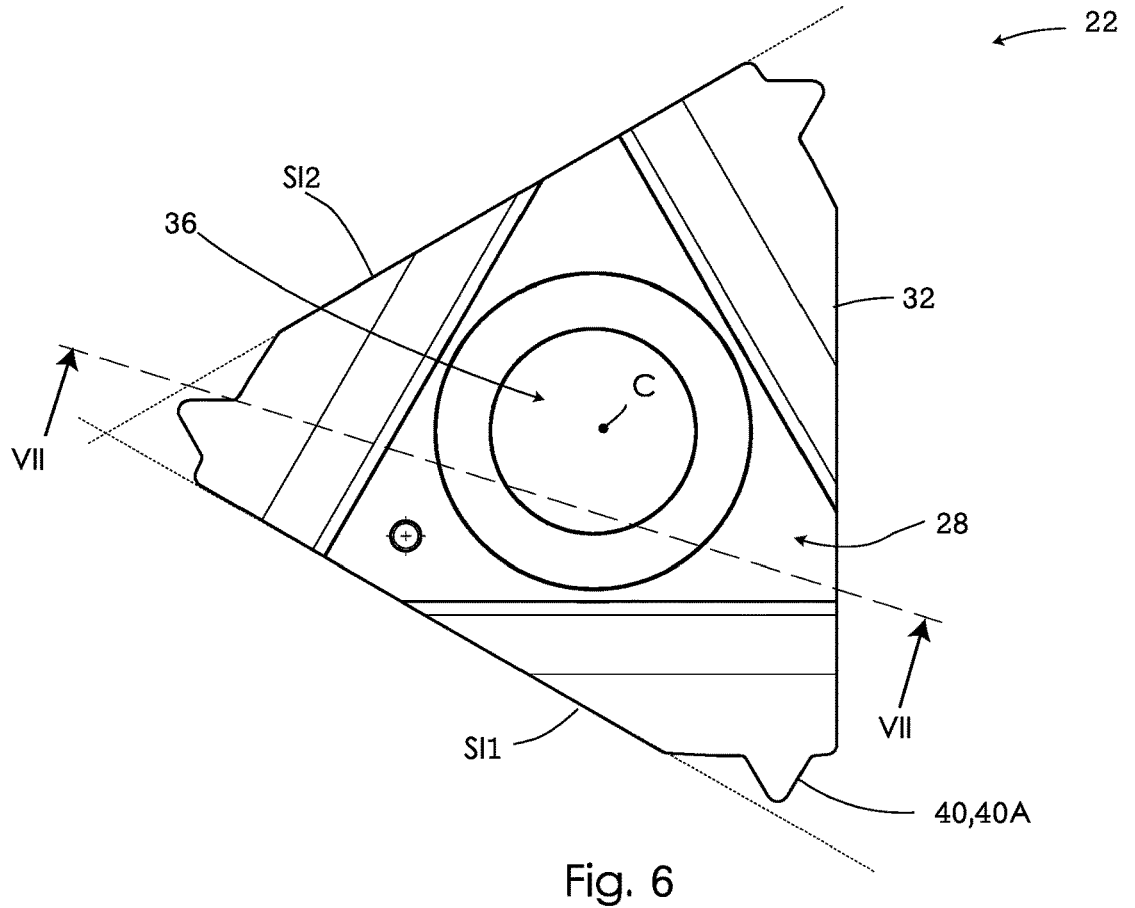
FIG. 6 is a top view of the cutting insert shown in FIG. 3.

Referring to FIG. 5, the three insert lower abutment surfaces 50 include at least one insert bearing abutment surface 50B. Referring to FIG. 7, in accordance with some embodiments of the subject matter of the present application, one of the at least one insert bearing abutment surface 50B is located under the cutting edge 40. The at least one insert bearing abutment surface 50B can be planar. The at least one insert bearing abutment surface 50B can be oriented perpendicular to the insert central axis C. Each of the at least one insert bearing abutment surface 50B can be formed on the insert lower base surface 34. In the configuration of the insert lower surface 30 having exactly three insert lower abutment surfaces 50, the exactly three insert lower abutment surfaces 50 can include exactly two insert bearing abutment surfaces 50B.

It is noted that the foregoing disclosure relating to the cutting insert 22 is associated to a single indexable position of the cutting insert 22. Every indexable position has features corresponding to those described above. In particular, for a triangular shaped cutting insert 22, there are exactly three insert wedge recesses 52.

Figure 8:
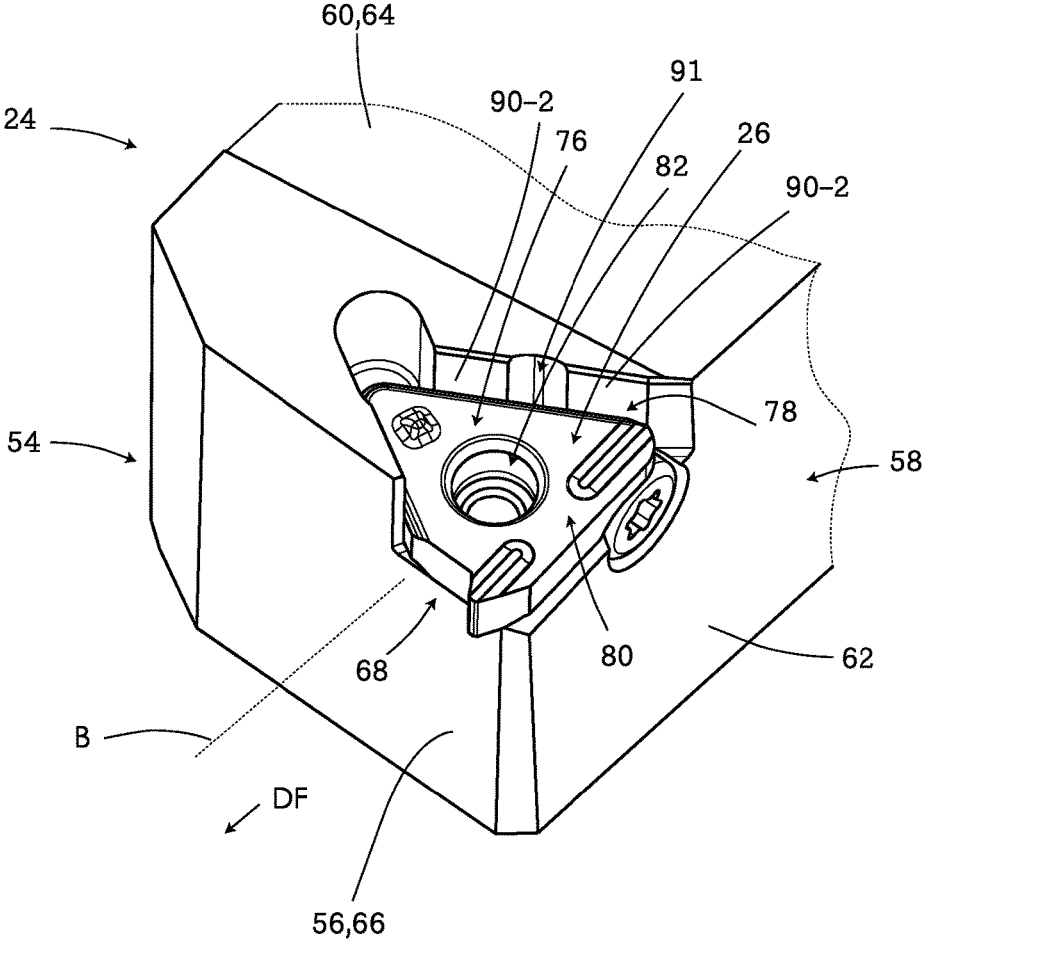
FIG. 8 is a perspective view of an insert pocket shown in FIG. 2.
Figures 9, 9A:
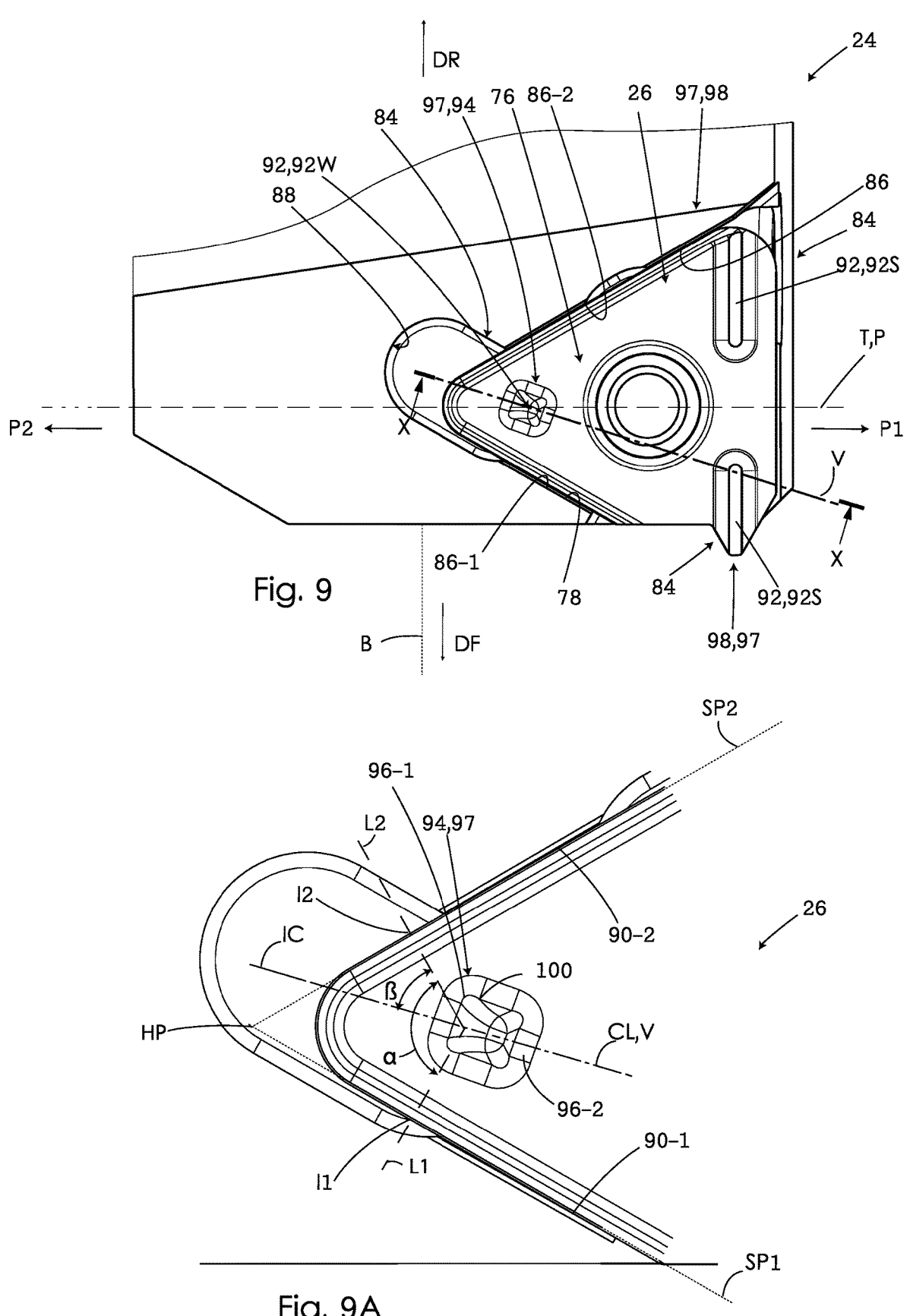
FIG. 9 is a top view of the insert pocket shown in FIG. 8.
FIG. 9A is detail of FIG. 9.
Figure 10:
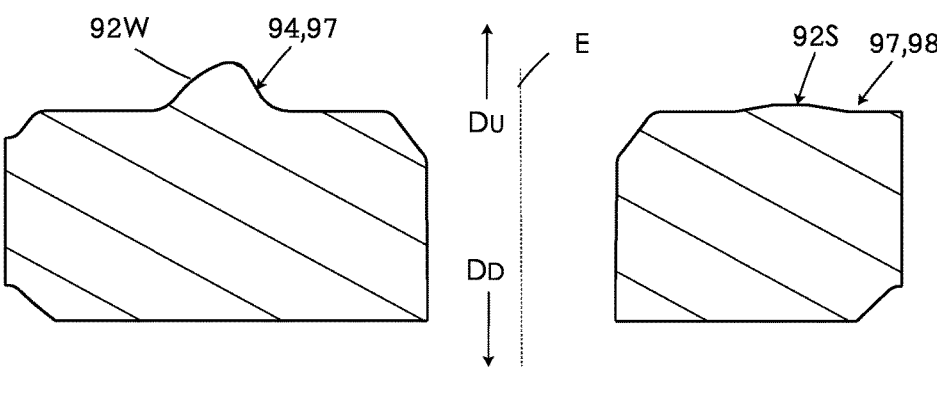
FIG. 10 is a cross section view taken along lines X-X shown in FIG. 9.

A second aspect of the subject matter of the present application relates to the insert holder 24. Reference is now made to FIGS. 8-10, showing the insert holder 24, having a holder longitudinal axis B that defines opposite forward and rearward directions DF, DR. As seen in FIG. 8, the insert holder 24 has a holder forward end 54. The insert holder 24 includes a holder forward end surface 56, formed at the holder forward end 54, and a holder peripheral surface 58, where the holder peripheral surface 58 forms a circumferential boundary of the holder forward end surface 56. The holder peripheral surface 58 extends circumferentially about the holder longitudinal axis B. The holder peripheral surface 58 includes a holder top surface 60 and holder side surface 62 which intersect each other and also the holder forward end surface 56.

It should be noted that use of the terms "forward" and "rearward" throughout the description and claims refer to a relative position in a direction of the holder longitudinal axis B downwards and upwards, respectively, in FIG. 11. In the present disclosure, "forward" is associated with the cutting end of the cutting tool 20.

Making reference to FIGS. 8, the insert holder 24 includes a holder pocket recess surface 64 and a holder pocket opening surface 66 which intersects the holder pocket recess surface 64. In this non-limiting example shown in the drawings, designed for external thread turning, the holder pocket recess surface 64 is formed from the holder top surface 58 and the holder pocket opening surface 66 is formed from the holder forward end surface 56. However, the present invention also applies to internal thread turning, where the holder pocket recess surface 64 is formed from the holder top surface 58 and the holder pocket opening surface 66 is formed from the holder side surface 62 (not shown).

The insert pocket 26 is recessed in the holder pocket recess surface 64 and includes a pocket opening 68 that opens out to the holder pocket opening surface 66. The purpose of the insert pocket 26 is to accommodate the cutting insert 22 when removably attached to the insert holder 24. The insert pocket 26 includes a pocket base surface 76 and a pocket peripheral surface 78 oriented transversely thereto. As shown in FIGS. 9, 10 and 11, the pocket peripheral surface 78 extends partially circumferentially about a pocket central axis E which defines opposite upward and downward direction Du, DD. The pocket peripheral surface 78 forms a partial boundary of the pocket base surface 76. The pocket central axis E can be perpendicular to the pocket base surface 76. Generally speaking, the pocket base surface 76 is the downmost part of the pocket 26. The pocket central axis E can intersect the flank infeed axis T.

It should also be noted that use of the terms "upward" and "downward" throughout the description and claims refer to a relative position in a direction of the pocket central axis E upwardly and downwardly, respectively, in FIG. 10.

In accordance with some embodiments of the subject matter of the present application, the insert holder 24 can include a shim 80 releasably attached to the insert holder 24. i.e., the shim 80 is detachable from the insert holder 24. The shim 80 forms part of the insert pocket 26. In particular, the pocket base surface 76 is formed on (an upper surface of) the shim 80.

In accordance with some embodiments of the subject matter of the present application, the insert pocket 26 can include a threaded hole 82, for threadingly receiving the clamping screw. The threaded hole 82 can extend along the pocket central axis E. The threaded hole 82 can open out to the pocket base surface 76.

Making reference to FIG. 9, in accordance with some embodiments of the subject matter of the present application, the pocket base surface 76 can have a polygonal basic shape defined by at least three pocket base corner portions 84. In this non-limiting example shown in the drawings, the pocket base surface 76 has triangular shape defined by exactly three pocket base corner portions 84.

The pocket peripheral surface 78 includes at least two pocket side surfaces 86. The at least two pocket side surfaces 86 includes first and second pocket side surfaces 86-1, 86-2. In accordance with some embodiments of the subject matter of the present application, the first and second pocket side surfaces 86-1, 86-2 can be connected by a pocket intermediate side surface 88. As seen in FIG. 9, the pocket intermediate side surface 88 can form a gap in the insert pocket 26 for a cutting tooth 42 having a non-active cutting edge 40B. The first pocket side surface 86-1 can extend to the pocket opening 68. The first pocket side surface 86-1 can intersect holder pocket opening surface 66.

Referring to FIG. 9A, the first and second pocket side surfaces 86-1, 86-2 include first and second pocket side abutment surfaces 90-1, 90-2, respectively. The first and second pocket side abutment surfaces 90-1, 90-2 converge towards each other in the back feed direction P2. The first and second pocket side abutment surfaces 90-1, 90-2 define first and second pocket side half-planes SP1, SP2, respectively. The first and second pocket side half-planes SP1, SP2 intersect with, and terminate with, each other at a half-plane axis HP. Stated differently, the first and second pocket side half-planes SP1, SP2 both extend from the half-plane axis HP. In accordance with some embodiments of the subject matter of the present application, the first pocket side abutment surface 90-1 and the pocket opening 68 can be located on one side of a feed plane P containing the flank infeed axis T and the pocket central axis E. The second pocket side abutment surface 90-2 can be located on the other side of the feed plane P. Referring to FIG. 8, it is noted that the second pocket side abutment surface 90-2 can be divided by a recess portion 91 (so that there are two co-planar sub-surfaces), but is still considered a single surface.

Reverting to FIG. 9, the pocket base surface 76 includes three pocket base abutment surfaces 92 which are angularly spaced apart about the pocket central axis E. The three pocket base abutment surfaces 92 are configured for abutting complementary surfaces on the cutting insert 22. In accordance with some embodiments of the subject matter of the present application, the pocket base surface 76 can include exactly three pocket base abutment surfaces 92. In the triangular shaped configuration of the pocket base surface 76, the exactly three pocket base abutment surfaces 92 can be located at different pocket base corner portions 84.

The three pocket base abutment surfaces 92 includes at least one pocket wedge abutment surface 92W. The at least one pocket wedge abutment surface 92W is formed on at least one male or female type pocket engagement member 97. The at least one male or female type pocket engagement member 97 is of the opposite type to the at least one male or female type insert engagement member 51. That is to say, when the at least one male or female type pocket engagement member 97 is of the male type then the at least one male or female type insert engagement member 51 is of the female type, and vice versa. The at least one pocket wedge abutment surface 92W is sloped relative to the pocket central axis E. In accordance with some embodiments of the subject matter of the present application, the at least one pocket wedge abutment surface 92W can converge towards at least one of the first and second pocket side half-planes SP1, SP2 in the downwards direction. The at least one pocket wedge abutment surface 92W can converge towards both of the first and second pocket side half-planes SP1, SP2 in the downwards direction. In the configuration of the pocket base surface 76 having exactly three pocket base abutment surfaces 92, the exactly three pocket base abutment surfaces 92 can include exactly one pocket wedge abutment surface 92W.

Making reference to FIG. 10, in accordance with some embodiments of the subject matter of the present application, in a cross-sectional view taken in a pocket vertical plane V oriented parallel to the pocket central axis E and intersecting the at least one pocket wedge abutment surface 92W, the at least one pocket wedge abutment surface 92W can be convexly curved. The pocket vertical plane V can bisect the at least one pocket wedge abutment surface 92W. In a cross-sectional view taken in a pocket horizontal plane oriented perpendicular to the pocket central axis E and intersecting the at least one pocket wedge abutment surface 92W, the at least one pocket wedge abutment surface 92W can be convexly curved.

Referring to FIG. 9A, in a top view of the insert pocket 26 (i.e., along the pocket central axis E), for any given contact point 100 on the at least one pocket wedge abutment surface 92W, an imaginary straight first line L1 which contains the given contact point 100 intersects the first pocket side half-plane SP1 perpendicularly at a first intersection point I1. An imaginary straight second line L2 which contains the given contact point 100 intersects the second pocket side half-plane SP2 perpendicularly at a second intersection point I2. The first and second intersection points I1, I2 subtend a main angle α at the given contact point 100. An imaginary straight contact line CL which is oriented perpendicularly to the at least one pocket wedge abutment surface 92W and which contains the contact point 100 intersects at least one of the first and second pocket side half-plane SP1, SP2 at a contact intersection point IC. It is understood that the contact line CL intersects both the first and second pocket side half-plane SP1, SP2 at the half-plane axis HP. The contact and second intersection points IC, I2 subtend a contact angle β at the given contact point 100. The contact angle β satisfies the condition: $0°<β≤α$. In some embodiments, the contact angle β can satisfy the condition: $0°<β<α/2$. In some embodiments, the contact angle β can satisfy the condition: $0°<β<α/2$.

In accordance with some embodiments of the subject matter of the present application, the at least one pocket engagement member 97 can include at least one pocket wedge protrusion 94 which projects from the pocket base surface 76. The at least one pocket wedge protrusion 94 can include diverging first and second protrusion flank surfaces 96-1, 96-2. The at least one pocket wedge protrusion 94 can have at least one pocket wedge abutment surface 92W formed thereon. Specifically, each pocket wedge abutment surface 92W can be formed on the first protrusion flank surface 96-1. Each of the at least one pocket wedge protrusion 94 can have exactly one pocket wedge abutment surface 92W formed thereon. The at least one pocket wedge protrusion 94 can include exactly one pocket wedge protrusion 94.

The three pocket base abutment surfaces 92 includes at least one pocket support abutment surface 92S. In accordance with some embodiments of the subject matter of the present application, one of the at least one pocket support abutment surface 92S is located adjacent the pocket opening 68. Locating one of the at least one pocket support abutment surface 92S in the vicinity of the cutting region provides firm support for the cutting insert 22. The at least one pocket support abutment surface 92S can be planar. The at least one pocket support abutment surface 92S can be oriented perpendicular to the pocket central axis E. In the configuration of the pocket base surface 76 having exactly three pocket base abutment surfaces 92, the exactly three pocket base abutment surfaces 92 can include exactly two pocket support abutment surfaces 92S. Moreover, the exactly one pocket wedge abutment surface 92W can be located closer to the pocket intermediate side surface 88 than the exactly two pocket support abutment surfaces 92S.

In accordance with some embodiments of the subject matter of the present application, the insert pocket 26 can include at least one pocket support protrusion 98 which projects from the pocket base surface 76. The at least one pocket support protrusion 98 can have at least one pocket support abutment surface 92S formed thereon. Each of the at least one pocket support protrusion 98 can have exactly one pocket support abutment surface 92S formed thereon. The at least one pocket support protrusion 98 can include exactly two pocket support protrusions 98.

In the assembled position of the cutting tool 20, the cutting insert 22 is removably attached to the insert holder 24 by a fastening member 102.

The cutting tooth 42 associated with the active cutting edge 40A is located at the pocket opening 68.

The first and second pocket side abutment surfaces 90-1, 90-2 abut the first and second insert side abutment surfaces 48-1, 48-2, respectively.

The insert lower surface 30 abuts the pocket base surface 76 at the three insert lower abutment surfaces 50 and the three pocket base abutment surfaces 92, respectively. Specifically, the at least one pocket support abutment surface 92S abuts the at least one insert bearing abutment surface 50B. The at least insert engagement member 51 engages with the at least pocket engagement member 97. Specifically, the at least one pocket wedge abutment surface 92W abuts the at least one insert wedge abutment surface 50W. In accordance with some embodiments of the subject matter of the present application, the insert lower surface 30 abuts the pocket base surface 76 only at the three insert lower abutment surfaces 50 and the three pocket base abutment surfaces 92, respectively.

In the embodiment having at least insert wedge recess 52 and at least one pocket wedge protrusion 94, it is noted that the second protrusion flank surface 96-2 is unabutted. The at least one pocket wedge protrusion 94 can be located in the at least insert wedge recess 52. In accordance with some embodiments of the subject matter of the present application, exactly one pocket wedge protrusion 94 can be located in exactly one insert wedge recess 52.

In accordance with some embodiments of the subject matter of the present application, the fastening member 102 can be a clamping screw. The clamping screw can be located in the through hole 36 and threadingly engaged with the threaded hole 82.

The fastening member 102 is configured to apply a clamping force F on the cutting insert 22 in a clamping force direction FD, when actuated. In the case of the clamping screw, actuation is performed by tightening the clamping screw.

Figure 12:
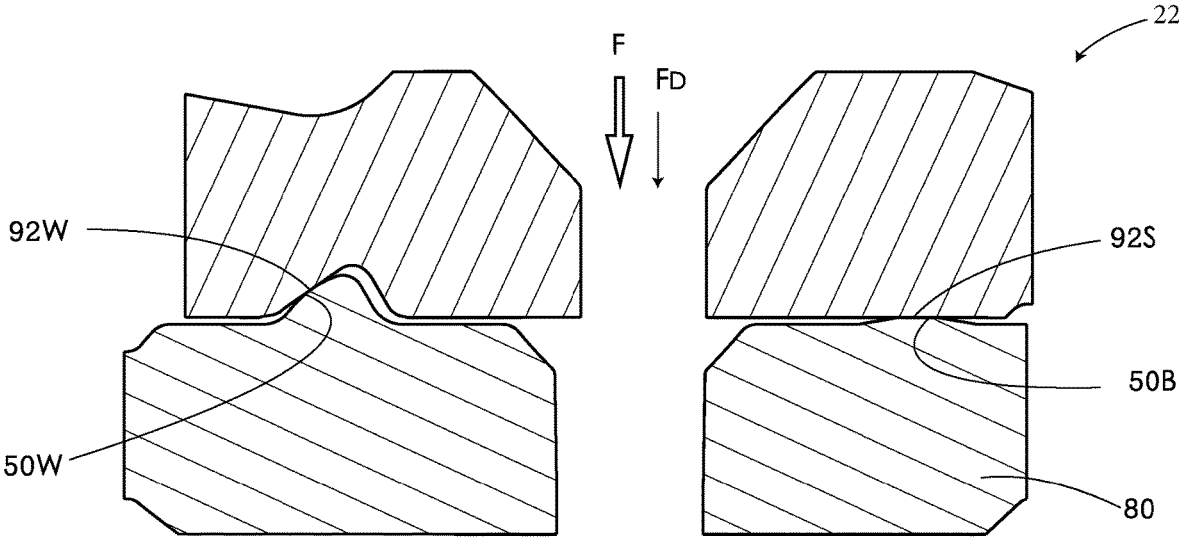
FIG. 12 is a cross section view taken along lines XII-XII shown in FIG. 11.

Referring to FIG. 12, in accordance with some embodiments of the subject matter of the present application, the threaded hole 82 can be centric in relation to the through hole 36 (that is to say, the through hole and the treaded hole are co-axial). In such a configuration the clamping force F is directed entirely vertically downwards.

Assembly of the cutting tool 20 (i.e., adjusting the cutting tool 20 to the assembled position) is accomplished by performing the following steps. Firstly, the fastening member 102 is actuated, thereby applying the clamping force F on the cutting insert 22. By virtue of the sloping orientation of the at least one pocket wedge abutment surface 92W and the at least one insert wedge abutment surface 50W, the clamping force F urges said surfaces to slide over each other so that the first and second insert side abutment surfaces 48-1, 48-2 are urged towards the first and second pocket side abutment surfaces 90-1, 90-2. With continued application of the clamping force F, the first insert side abutment surface 48-1 comes into contact with the first pocket side abutment surfaces 90-1 and/or the second insert side abutment surface 48-2 comes into contact with the second pocket side abutment surface 90-2. Further application of the clamping force F brings both the first and second insert side abutment surfaces 48-1, 48-2 into firm abutment with the first and second pocket side abutment surfaces 90-1, 90-2, respectively.

It is noted that the subject matter of the present invention does not relate to a serrated coupling (i.e., inter-engaging grooves and ridges) of the type described in, for example, U.S. Pat. No. 5,810,518.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A cutting tool, having a flank infeed axis defining opposite front and back feed directions, the cutting tool comprising:

an insert holder comprising:

a holder pocket recess surface and a holder pocket opening surface intersecting the holder pocket recess surface; and an insert pocket having a pocket central axis, the insert pocket being recessed in the holder pocket recess surface and opening out to the holder pocket opening surface at a pocket opening, and comprising:

a pocket peripheral surface extending partially circumferentially about the pocket central axis and forming a partial boundary of a pocket base surface, wherein:

the pocket peripheral surface comprises first and second pocket side abutment surfaces which converge towards each other in the back feed direction and define first and second pocket side half-planes, respectively, which both extend from a half-plane axis; and the pocket base surface comprises three pocket base abutment surfaces, the three pocket base abutment surfaces being angularly spaced apart about the pocket central axis and comprising:

at least one pocket support abutment surface; and at least one pocket wedge abutment surface formed on at least one male or female type pocket engagement member, the at least one pocket wedge abutment surface sloping with respect to the pocket central axis;

wherein in a top the insert pocket, for any given contact point on the at least one pocket wedge abutment surface:

an imaginary straight first line containing the given contact point intersects the first pocket side half-plane perpendicularly at a first intersection point;

an imaginary straight second line containing the given contact point intersects the second pocket side half-plane perpendicularly at a second intersection point;

the first and second intersection points subtend a main angle at the given contact point;

an imaginary straight contact line oriented perpendicularly to the at least one pocket wedge abutment surface and containing the contact point intersects at least one of the first and second pocket side half-planes at a contact intersection point;

the contact and second intersection points subtend a contact angle at the given contact point, the contact angle satisfying the condition: $0° < \beta < \alpha$; and a cutting insert having an insert central axis, the cutting insert (22) comprising:

opposite insert upper and lower surfaces and an insert peripheral surface extending therebetween;

a cutting edge formed at the intersection of the insert upper surface and the insert peripheral surface; wherein:

the insert peripheral surface comprises at least three insert side surfaces and at least three insert corner surfaces alternating therewith, the at least three insert side surfaces comprising first and second insert side abutment surfaces, respectively;

the insert lower surface comprises three insert lower abutment surfaces angularly spaced apart about the insert central axis, the three insert lower abutment surfaces comprising:

at least one insert bearing abutment surface; and at least one insert wedge abutment surface formed on at least one male or female type insert engagement member, the male or female type insert engagement member being the opposite type to the at least one male or female type pocket engagement member, the at least one insert wedge abutment surface sloping with respect to the insert central axis; wherein:

the cutting insert is removably retained in the insert pocket by a fastening member;

the first and second pocket side abutment surfaces abut the first and second insert side abutment surfaces, respectively;

the at least one pocket support abutment surface abuts the at least one insert bearing abutment surface; and the at least one male or female type insert engagement member engages with the at least one male or female type pocket engagement member, the at least one pocket wedge abutment surface abutting the at least one insert wedge abutment surface.

2. The cutting tool according to claim 1, wherein:

one of the at least one pocket support abutment surface is located adjacent the pocket opening; and one of the at least one insert bearing abutment surface is located under the cutting edge.

3. The cutting tool according to claim 1, wherein:

the at least one pocket support abutment surface is planar; and the at least one insert bearing abutment surface is planar.

4. The cutting tool according to claim 1, wherein the first pocket side abutment surface and the pocket opening are located on one side of a feed plane containing the flank infeed axis and the pocket central axis and the second pocket side abutment surface is located on the other side of the feed plane.

5. The cutting tool according to claim 1, wherein the insert lower surface abuts the pocket base surface only at the three insert lower abutment surfaces and the three pocket base abutment surfaces, respectively.

6. The cutting tool according to claim 1, wherein:

the at least one male or female type pocket engagement member comprises at least one pocket wedge protrusion projecting from the pocket base surface, the at least one pocket wedge protrusion having at least one pocket wedge abutment surface formed thereon;

the at least one male or female type insert engagement member comprises at least one insert wedge recess recessed in the insert lower surface, the at least one insert wedge recess having at least one insert wedge abutment surface formed thereon; and the at least one pocket wedge protrusion is located in the at least one insert wedge recess.

7. The cutting tool according to claim 6, wherein each of the at least one pocket wedge protrusion has exactly one pocket wedge abutment surface formed thereon.

8. The cutting tool according to claim 6, wherein each of the at least one insert wedge recess has exactly one insert wedge abutment surface formed thereon.

9. The cutting tool according to claim 6, wherein the insert pocket comprises at least one pocket support protrusion projecting from the pocket base surface, the at least one pocket support protrusion having at least one pocket support abutment surface formed thereon.

10. The cutting tool according to claim 9, wherein each of the at least one pocket support protrusion has exactly two insert wedge bearing surfaces formed thereon.

11. The cutting tool according to claim 1, wherein the at least one insert wedge abutment surface is planar.

12. The cutting tool according to claim 1, wherein in a cross-sectional view taken in a pocket vertical plane oriented parallel to the pocket central axis and intersecting the at least one pocket wedge abutment surface, the at least one pocket wedge abutment surface is convexly curved.

13. The cutting tool according to claim 1, wherein:

the insert lower surface comprises a planar insert lower base surface; and each of the at least one insert bearing abutment surface is formed on the insert lower base surface.

14. The cutting tool according to claim 1, wherein:

the pocket base surface comprises exactly three pocket base abutment surfaces; and the insert lower surface comprises exactly three insert lower abutment surfaces.

15. The cutting tool according to claim 14, wherein:

the pocket base surface has a triangular basic shape defined by exactly three pocket base corner portions; and the exactly three pocket base abutment surfaces are located at different pocket corner base portions.

16. The cutting tool according to claim 14, wherein:

the exactly three pocket base abutment surfaces comprise exactly one pocket wedge abutment surface and exactly two pocket support abutment surfaces; and the exactly three insert lower abutment surfaces comprise exactly one insert wedge abutment surface and exactly two insert bearing abutment surfaces.

17. The cutting tool according to claim 16, wherein:

the first and second pocket side surfaces are connected by a pocket intermediate side surface; and the exactly one pocket wedge abutment surface is located closer to the pocket intermediate side surface than the exactly two pocket support abutment surfaces.

18. The cutting tool according to claim 1, wherein the contact angle satisfies the condition: $0°<\beta<\alpha/2$.

19. The cutting tool according to claim 1, wherein:

the fastening member is configured to apply a clamping force on the cutting insert in a clamping force direction; and the at least one pocket wedge abutment surface and the at least one insert wedge abutment surface are configured to slide over each other when the clamping force is applied on the cutting insert so that the first and second insert side abutment surfaces are urged towards and come into contact with the first and second pocket side abutment surfaces, respectively.

20. The cutting tool according to claim 1, wherein:

the cutting insert comprises a through hole extending along the insert central axis and opening out to the insert upper and lower surfaces;

the insert pocket comprises a threaded hole extending along the pocket central axis and opening out to the pocket base surface;

the fastening member is a clamping screw; and the clamping screw is located in the through hole and threadingly engaged with the threaded hole.

21. The cutting tool according to claim 19, wherein the threaded hole is centric in relation to the through hole.

22. The cutting tool according to claim 1, wherein:

the insert holder comprises a shim releasably attached thereto; and the pocket base surface is formed on the shim.

* * * * *